United States Patent Office 3,150,757
Patented Sept. 29, 1964

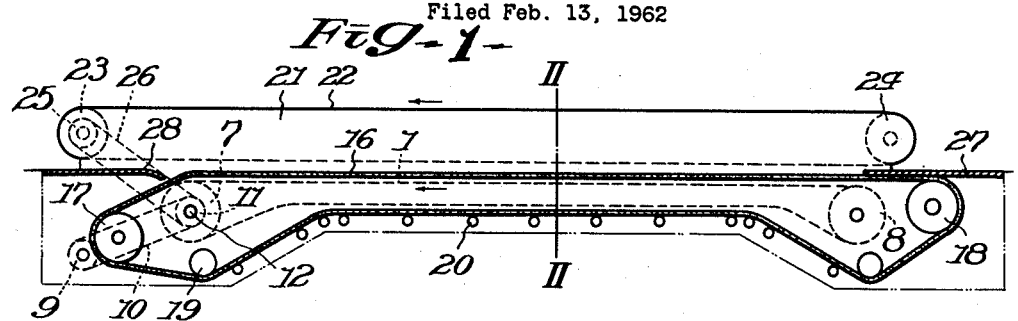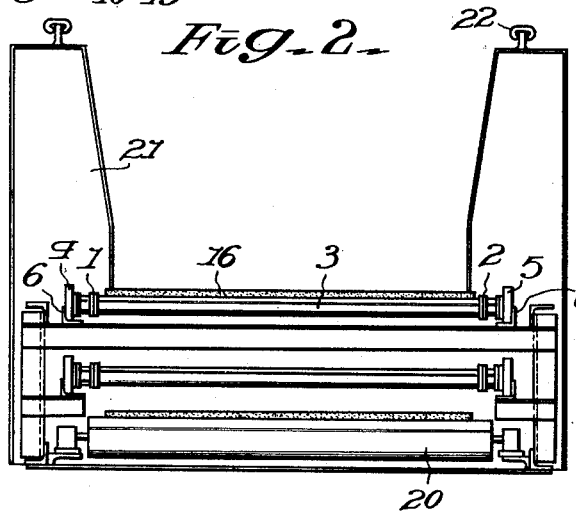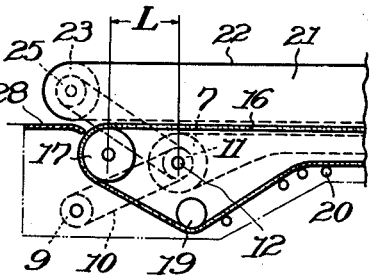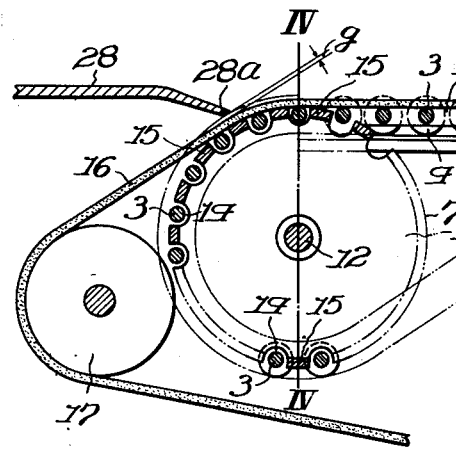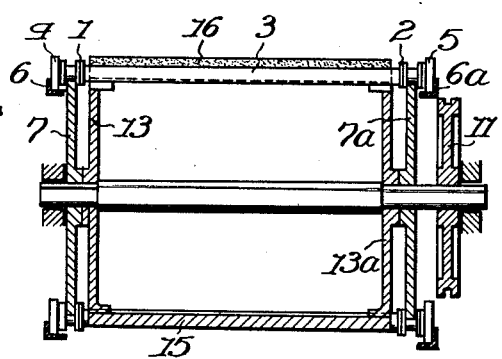

3,150,757
MOVING SIDEWALK
Minejiro Jin, Ibaragi-ken, Japan, assignor to Kabushiki Kaisha Hitachi Seisakusho, Tokyo-to, Japan, a joint-stock company of Japan
Filed Feb. 13, 1962, Ser. No. 172,976
Claims priority, application Japan, Feb. 13, 1961, 36/4,045
5 Claims. (Cl. 198—16)

This invention relates to conveying means, and more particularly it relates to a new moving sidewalk for conveying or moving human beings, particularly human beings in crowded or congested places, in a desired direction in a safe yet rapid manner. Some examples of places where the moving sidewalk of this invention may be advantageously used are: airports, platforms and walkways of railway stations, bus stations and stops, connecting ways between buildings, department stores, public exhibitions, and places of public entertainment.

Moving stairways of the type commonly called escalators are, of course, known, and the utilization of such mechanical apparatuses for horizontal conveyance is, of course, possible. However, since an escalator type of apparatus has a complex construction, which is relatively expensive in manufacturing cost, the adoption of such a mechanical system for a horizontal moving stairway is uneconomical.

For a level way which is to move, the first known construction to be thought of is that of a belt conveyor comprising an endless rubber belt passed over and driven by horizontal terminal drums. Such a belt conveyor is suitable for moving such articles as ores and coal, but when a belt conveyor of conventional construction is used for moving human beings, the imparting of an uncomfortable pulse sensation to the feet of the passengers standing on the belt is unavoidable even if a large number of closely spaced, intermediate track rollers for supporting the upper part of the belt is used, and the belt thickness is increased.

For a purpose similar to that of the present invention, an invention of a moving sidewalk of the following description has been disclosed in Japanese Patent No. 261,880. This known moving sidewalk has a moving, endless chain belt which is composed of two left and right endless chains passed over a pair of left and right driving sprocket wheels fixed to the same shaft at one terminal end or part where the travel direction of the belt is reversed and a pair of left and right, guide or idler sprockets disposed on the other terminal end, a large number of transverse shafts connecting the said left and right endless chains and channel-shaped members with flat tops, straddling and supported by the said transverse shafts. This endless chain belt is moved by the rotation of the aforesaid driving sprocket wheels and is supported at each terminal end by a guide roller or drum. A tread way is formed by an endless rubber belt of loop form around the outer part of this endless chain belt. When persons board this rubber belt, it is caused by the weight of the persons to contact the flat upper surfaces of the channel-shaped members of the moving endless chain belt, whereby the rubber belt is caused by frictional transmission due to this contact to be moved together with the endless chain belt. In this known moving sidewalk, however, a disadvantage still exists. That is, within the space interval L as shown in FIG. 5 of the accompanying drawing between the drive sprocket wheel 7 over which the endless chain belt is passed at one terminal end and the roller 17 over which the rubber belt is passed at the corresponding terminal end, the rubber belt 16 is caused by the weight of the passengers directly above to deflect downwardly in a sudden manner, causing the passengers to feel an uncomfortable sensation.

In view of the various foregoing disadvantages of known conveying means of this type, the present invention has the following objects.

It is an object to provide a new, level moving sidewalk of relatively simple construction entailing low manufacturing costs.

It is another object to provide a new, level moving sidewalk which affords riding comfort and does not impart an uncomfortable pulse sensation to the feet of the passengers riding thereon.

It is a further object to provide a new, level moving sidewalk wherein the disadvantage of sudden downward deflection of the rubber belt as described above is eliminated.

The details of the invention as well as the manner in which the foregoing objects may be best achieved will be more clearly apparent by reference to the following description of a representative embodiment of the invention when taken in conjunction with the accompanying illustrations in which like parts are designated by like reference numerals, and in which:

FIG. 1 is a side elevational view, in vertical section and in diagrammatical form, indicating the construction of one embodiment of the moving sidewalk according to this invention;

FIG. 2 is an enlarged cross-sectional view taken along line II—II of FIG. 1;

FIG. 3 is an enlarged side elevational view, in vertical section, showing the important parts of the moving sidewalk of this invention;

FIG. 4 is a cross-sectional view taken along the line IV—IV of FIG. 3; and

FIG. 5 is a side elevational view, in vertical section and in diagrammatical form, indicating the construction of the terminal end of a conventional moving sidewalk.

Referring to the illustrations, the principal travelling members of the moving sidewalk of this invention are a pair of left and right endless chains 1 and 2 for driving the moving sidewalk, a plurality of parallel transverse shafts 3 which connect the said left and right endless chains, and rollers 4 and 5 provided on the ends of each transverse shaft 3. The rollers 4 and 5 roll on and are guided by guide rails 6 and 6a. The endless chains 1 and 2 are engaged with and are driven by a pair of left and right driving sprocket wheels 7 and 7a fixed to a shaft 12 at one terminal end and are passed over guide or idler sprockets 8 at the other terminal end.

Driving power is transmitted from a prime mover (not shown) through a prime mover sprocket 9, and endless chain 10, and a sprocket 11 fixed to the shaft 12 of the driving sprockets 7 and 7a, and, hence, by way of the said shaft 12 to the said driving sprockets 7 and 7a. The shaft 12 also has, fixed thereto between the driving sprockets 7 and 7a, auxiliary sprocket wheels 13 and 13a which have around their peripheries cut-outs 14 so formed as to engage loosely with the transverse shafts 3 of the endless chain mechanism. These auixliary sprocket wheels are mutually connected by a plurality of transverse bridging members 15, whereby a drum-shaped structure is formed. The members 15 receive and locally support an endless rubber belt 16 which forms the exterior part of the moving sidewalk, being looped around the outside of the parallel transverse shafts 3 of the endless chain mechanism. This rubber belt 16 is passed over and is guided by guide rollers 17 and 18 at the terminal ends of the moving sidewalk and by rollers 19 and 20 on its return path.

The embodiment here described has side railings 21 on both sides of the moving sidewalk. Moving handrails 22 of endless belt form are supported on and slide along the top surfaces of the side railings 21 and are passed around and driven by driving wheels 23 at one terminal end and are passed around and guided by idler wheels 24 at the other terminal end. The driving wheels 23 are driven by power transmitted from the prime mover sprocket 9 by way of the endless chain 10, the sprocket 11, the shaft 12, sprockets (not shown) fixed to the left and right ends of the shaft 12, endless chains 26, and sprockets 25 fixed to the same shafts as the driving wheels 23, whereby the moving handrails 22 are driven in the direction of the arrow shown in FIG. 1 at a speed which is synchronized with that of the rubber belt 16 of the moving sidewalk.

A boarding plate 27 and a step-off plate 28 are provided, respectively, at the loading and unloading ends of the moving sidewalk. During operation, the passengers step onto the rubber belt 16 from the boarding plate 27. The rubber belt 16 contacts the parallel transverse shafts 3 of the endless chain mechanism and is caused by the frictional resistance due to this contact to move synchronously with the endless chains 1 and 2, thereby producing the desired action of a moving way.

The construction of a known moving way in the vicinity of the step-off plate 28 is indicated in FIG. 5. In this arrangement, a distance L in which the rubber belt 16 is unsupported by the endless chain mechanism exists between the shaft of the drive sprockets 7 and the shaft of the guide roller 17. Consequently, this construction has the disadvantage that the rubber belt 16 deflects abruptly in this distance L and causes the passengers to feel an uncomfortable sensation.

The present invention seeks to eliminate the above-described disadvantage by a novel construction as described below. As was described hereinbefore and as is shown in FIGS. 3 and 4, auxiliary sprocket wheels 13 and 13a are fixed on the sprocket shaft 12 between the driving sprockets 7 and 7a which drive the endless chains 1 and 2, these auxiliary sprockets 13 and 13a having, on their peripheries, cut-outs 14 for loosely engaging with the parallel transverse shafts 3 of the endless chain mechanism and, on their peripheries between the said cut-outs 14, a plurality of transverse bridging members 15 which support the rubber belt 16, and which connect the two auxiliary sprockets 13 and 13a to form a drum-shaped wheel. The downwardly inclined end 28a of the aforesaid step-off plate 28 is disposed with respect to the outer surface of the rubber belt 16 so as to confront the said belt 16 riding on the said transverse bridging members 15 of the said drum-shaped wheel with a small gap g therebetween. By this construction, the aforementioned span L existing in the known moving sidewalk, wherein the rubber belt 16 is unsupported, can be eliminated. Accordingly, the above mentioned discomfort which was unavoidable in the case of the known moving sidewalk can be eliminated, and the riding comfort and safety of the moving sidewalk can be remarkably improved.

While, in the embodiment illustrated in FIGS. 1 and 3, the guide roller 17 of the rubber belt 16 is disposed to the left (as viewed in FIGS. 1 and 3) and slightly below the driving sprockets 7 and 7a, and the end 28a of the step-off plate 28 is provided with a suitable inclination, it will be obvious that an equivalent effect may be obtained also by omitting the guide roller 17, and causing the reversing portion of the rubber belt 16 to be guided directly by and on the transverse bridging members 15 connecting the auxiliary sprockets 13 and 13a.

Although this invention has been described with respect to a particular embodiment thereof, it is not to be so limited as changes and modifications may be made therein which are within the full intended scope of the invention, as defined by the appended claims.

What is claimed is:

1. In a moving sidewalk having a pair of left and right endless driving chains which are passed, at the terminal ends, over a pair of left and right, driving sprocket wheels fixed on a common shaft and a pair of left and right, guide or idler sprocket wheels, and which are mutually connected by a plurality of transverse shafts, and an endless rubber belt looped about the outside of the said driving chains so as to contact the said transverse shafts, the construction wherein a drum-shaped, auxiliary sprocket wheel having a plurality of grooves on its cylindrical surface, parallel to its axis, for loosely engaging with aforesaid transverse shafts, and having, between the said grooves, transverse bridging members for contacting and supporting the aforesaid rubber belt is fixed on the said common shaft of the said pair of left and right, driving sprocket wheels, between the said sprocket wheels, and the end of a step-off plate is disposed to confront the said rubber belt, in its position supported on the said transverse bridging members of the said drum-shaped, auxiliary sprocket wheel, with a small gap between the said end of the step-off plate and the said rubber belt.

2. In a moving sidewalk for passengers the combination of a chain assembly comprising a pair of laterally spaced endless chains and a plurality of transverse shafts extending transversely of said sidewalk and interconnecting said chain, said shafts being spaced apart in a direction lengthwise of said sidewalk, a pair of coaxial laterally spaced sprockets at each end of said sidewalk, said chains running over said sprockets, means operatively connected to and driving at least one pair of said sprockets and thereby driving said chains, an endless flexible belt looped around the outside of said chain assembly and having an upper run supported by said transverse shafts, said run having an entrance end adjacent one of said pairs of sprockets and a discharge end adjacent the other of said pairs of sprockets, a drum disposed coaxially between the sprockets at least the discharge end of said run, said drum rotating with said sprockets and having in its periphery longitudinally extending recesses spaced circumferentially to receive said transverse shafts as said chassis run over said sprocket and transverse bridging portions disposed between said recesses and engaging said belt to support said belt between said transverse shafts and a step-off plate at the discharge end of said run, said plate substantially contacting said belt where supported by said drum.

3. A moving sidewalk according to claim 2, in which said belt runs partly around said drum, conforming to the curvature of said drum, and in which said step-off plate substantially contacts said belt at a point substantially beyond the point at which said belt initially engages said drum.

4. A moving sidewalk according to claim 2, in which rollers on opposite ends of said transverse shafts roll on tracks extending between said pairs of sprockets to provide continuous support for said transverse shafts and thereby provide continuous support for the upper run of said belt.

5. A moving sidewalk according to claim 2, in which a said drum is disposed between each of both pairs of sprockets at the opposite ends of said upper run.

References Cited in the file of this patent

UNITED STATES PATENTS

| | | |
|---|---|---|
| 899,933 | Wheeler | Sept. 29, 1908 |
| 2,804,191 | King | Aug. 27, 1957 |